(12) United States Patent
Bayer

(10) Patent No.: US 12,243,207 B2
(45) Date of Patent: Mar. 4, 2025

(54) IMAGE TAKING METHOD, IMAGE ANALYSIS METHOD, METHOD FOR TRAINING AN IMAGE ANALYSIS NEURAL NETWORK, AND IMAGE ANALYSIS NEURAL NETWORK

(71) Applicant: 77 Elektronika Müszeripari Kft., Budapest (HU)

(72) Inventor: Gábor Bayer, Budapest (HU)

(73) Assignee: 77 Elektronika Müszeripari Kft., Budapest (HU)

(*) Notice: Subject to any disclaimer, the term of this patent is extended or adjusted under 35 U.S.C. 154(b) by 428 days.

(21) Appl. No.: 17/609,547

(22) PCT Filed: Mar. 31, 2020

(86) PCT No.: PCT/HU2020/050011
§ 371 (c)(1),
(2) Date: Nov. 8, 2021

(87) PCT Pub. No.: WO2020/225580
PCT Pub. Date: Nov. 12, 2020

(65) Prior Publication Data
US 2022/0230295 A1    Jul. 21, 2022

(30) Foreign Application Priority Data

May 8, 2019 (HU) ................................. P1900144
Feb. 24, 2020 (HU) ................................. P2000067

(51) Int. Cl.
*G06T 7/00* (2017.01)
*G01N 15/04* (2006.01)
(Continued)

(52) U.S. Cl.
CPC ......... *G06T 7/0002* (2013.01); *G01N 15/042* (2013.01); *G02B 21/365* (2013.01);
(Continued)

(58) Field of Classification Search
None
See application file for complete search history.

(56) References Cited

U.S. PATENT DOCUMENTS 9,939,623 B2    4/2018  Chan et al.
11,803,964 B2*  10/2023 Greenfield ........... G02B 21/367
(Continued)

OTHER PUBLICATIONS

European Patent Office, International Search Report in PCT Application No. PCT/HU2020/050011, Sep. 22, 2020 (3 pgs.).
(Continued)

*Primary Examiner* — Dov Popovici
(74) *Attorney, Agent, or Firm* — Wood Herron & Evans LLP

(57) ABSTRACT

The invention is an image taking method in which images are taken with a microscope in an analyzing space at focal plane positions shifted with an equal step size, and an image is selected from the taken images for further image processing; the images are taken of a sediment of a liquid; the method includes: taking, in a first spatial region of the analyzing space, a first depth image sequence, and selecting from the first depth image sequence the image with the best contrast for further image processing, and taking, in a second spatial region of the analyzing space, a second depth image sequence with fewer images by taking into account the previous step, and selecting from the second depth image sequence the image with the best contrast for further image processing. The invention further includes an image analysis neural network for use with the above method.

14 Claims, 3 Drawing Sheets

(51) Int. Cl.
  *G02B 21/36* (2006.01)
  *G06N 3/08* (2023.01)
  *H04N 23/67* (2023.01)

(52) U.S. Cl.
  CPC ............... *G06N 3/08* (2013.01); *H04N 23/67* (2023.01); *G06T 2207/10016* (2013.01); *G06T 2207/10028* (2013.01); *G06T 2207/10056* (2013.01); *G06T 2207/10148* (2013.01); *G06T 2207/20081* (2013.01); *G06T 2207/20084* (2013.01); *G06T 2207/30168* (2013.01)

(56) References Cited

U.S. PATENT DOCUMENTS

2012/0249770 A1 10/2012 Hamm
2019/0087953 A1* 3/2019 Yorav-Raphael ..... G06T 7/0002

OTHER PUBLICATIONS

European Patent Office, International Preliminary Report on Patentability in PCT Application No. PCT/HU2020/050011, Sep. 2, 2021 (34 pgs.).
European Patent Office, Written Opinion of the International Searching Authority in PCT Application No. PCT/HU2020/050011, Sep. 30, 2020 (11 pgs.).

* cited by examiner

IMAGE TAKING METHOD, IMAGE ANALYSIS METHOD, METHOD FOR TRAINING AN IMAGE ANALYSIS NEURAL NETWORK, AND IMAGE ANALYSIS NEURAL NETWORK

This application claims priority, under Section 371, and/or as a continuation under Section 120, to PCT Application No. PCT/HU2020/050011, filed Mar. 31, 2020, which claims priority to Hungarian Application Nos. P2000067, filed on Feb. 24, 2020 and P1900144, filed on May 8, 2019.

TECHNICAL FIELD

The invention relates to an image analysis method, a method for training an image analysis neural network, and an image analysis neural network that are adapted to be applied in relation to an image taking method and a container for analyzing various liquids, which container can be used for example as a cuvette for the optical analysis of urine.

BACKGROUND ART

For the analysis of liquids, for example urine, there are many prior art container designs. For the purpose of an optical analysis, in general flat containers or cuvettes are used, which enable preferably with microscopic or digital image processing methods the analysis of a liquid filled into an analyzing space between transparent window sections arranged one below the other. To ensure a simple manufacturing method, these containers consist of an upper part and a lower part connected to each other in parallel. The containers comprise an inlet aperture for filling the liquid to be analyzed, and an outlet aperture through which the air escapes from the container when the liquid is filled. A cuvette also applicable for the purposes of the present invention is disclosed for example in WO 2008/050165 A1.

For the optical analysis of the liquid in the cuvette, images of the liquid have to be taken (i.e. recorded). To address the problem posed by the depth extension of the liquid and the uncertainties of the height locations of the objects to be analyzed therein, it is a known technical solution to take images of a given region applying different focal plane positions, such that those contain as much relevant information as possible. These images can be applied not only for image analysis, but also for training an image analysis neural network.

In US 2004/0202368 A1, US 2013/0322741 A1 and US 2014/0348409 A1, the possibility of applying different focal planes for image analysis purposes is generally mentioned.

The technical solution disclosed in US 2008/0082468 A1 comprises recording images at equidistant focal planes, and applying for the training images belonging to two groups taken at different focal planes. However, according to the document the focal planes are applied proceeding in only one direction from the "ideal" focal plane, and it does not mention a solution that would apply focal planes surrounding (i.e. "sandwiching") the ideal one. As a result of that, the document does not teach the use of images taken below and above a selected focal plane for training and for image analysis.

In US 2015/0087240 A1, image taking at multiple focal planes is disclosed, but according to the document the aim of this is to select the best-focused image therefrom. Accordingly, a combined analysis of multiple images taken at different focal planes is not included in this technical solution either.

WO 2013/104938 A2 contains a generic description of the possibility of simultaneously analyzing images taken at different focal planes, and thereby inputting extra information for decision-making. However, taking images in an equidistant manner at both sides, and training applying an even wider range are also not discussed in this document.

A common disadvantage of the prior art technical solutions is that in the case of distributed images in multiple spatial regions of the analyzing space, which are necessary for a comprehensive liquid analysis, they do not provide an advantageous solution for finding the focal plane providing the best contrast, and for effectively utilizing such information for other spatial regions. In case the focal plane providing the best contrast has to be found at every location (i.e. in every analyzed spatial region) by scanning through the entire depth range, the process becomes lengthy and overly resource-consuming.

An image taking method is disclosed in US 2019/087953 A1.

Another common drawback of the prior art technical solutions is that they do not enable an image analysis, a training of an image analysis neural network, and implementing the trained image analysis neural network, in a way supported by an effective image taking method.

DESCRIPTION OF THE INVENTION

According to the invention it has been recognized that, if the focal plane providing the best contrast in the relevant depth range of the analyzing space has already been found, then this information can be utilized for taking images in other spatial regions of the flat-bottom analyzing space, and there preferably a much smaller depth range has to be scanned through in order to find the image providing the best contrast. It has also been recognized that some of the images obtained during the depth scan can be utilized both for training the image analysis neural network and for analyzing the images, which allows for providing a more robust image analysis and training process.

The object of the invention is to eliminate the disadvantages of the prior art technical solutions as much as possible, and to provide the above described advantages. The objects of the invention have been achieved by the image analysis method according to claim 1, and by the training method according to claim 11. invention are defined in the dependent claims.

BRIEF DESCRIPTION OF THE DRAWINGS

Preferred embodiments of the invention are described below by way of example with reference to the following drawings, where.

MODES FOR CARRYING OUT THE INVENTION

The container applied for the method according to the invention is preferably implemented as a cuvette for urine analysis allowing an optical analysis of a liquid filled therein. The optical analysis is carried out preferably by means of a microscope, under illumination. Prior to the analysis the filled up container is centrifuged, which results in the precipitation of urine-sediment on an inner polished surface of a transparent lower window portion in a lower part of the container. The container can be applied for the digital analysis of an image generated from this sediment.

Figure 1A:
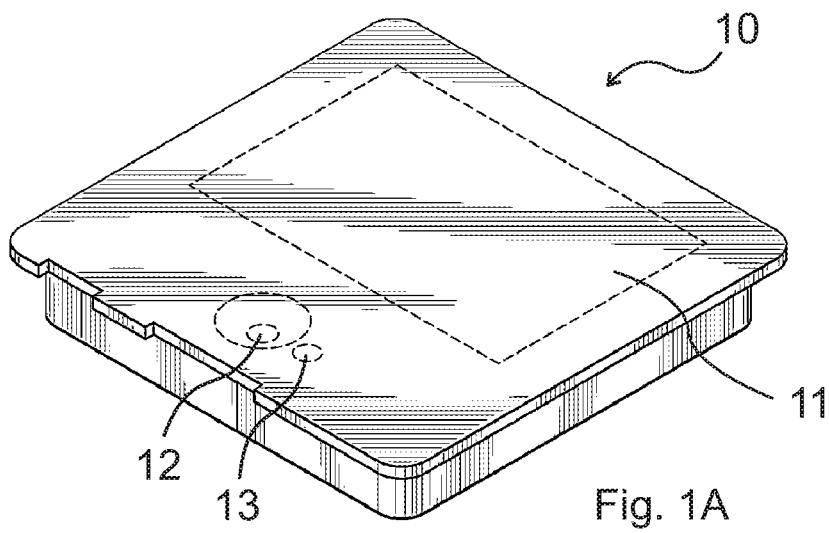
FIG. 1A is a spatial view of an upper part of an exemplary cuvette.
Figure 1B:
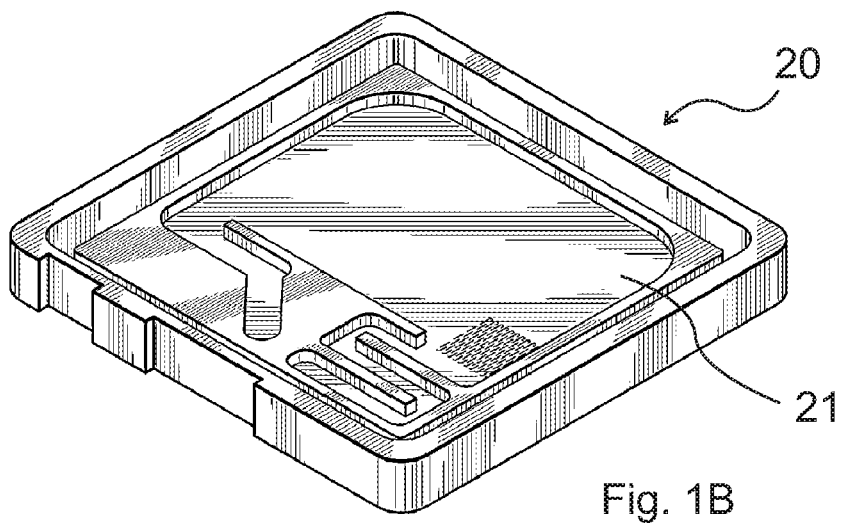
FIG. 1B is a spatial view of a lower part of the exemplary cuvette.
Figure 1C:
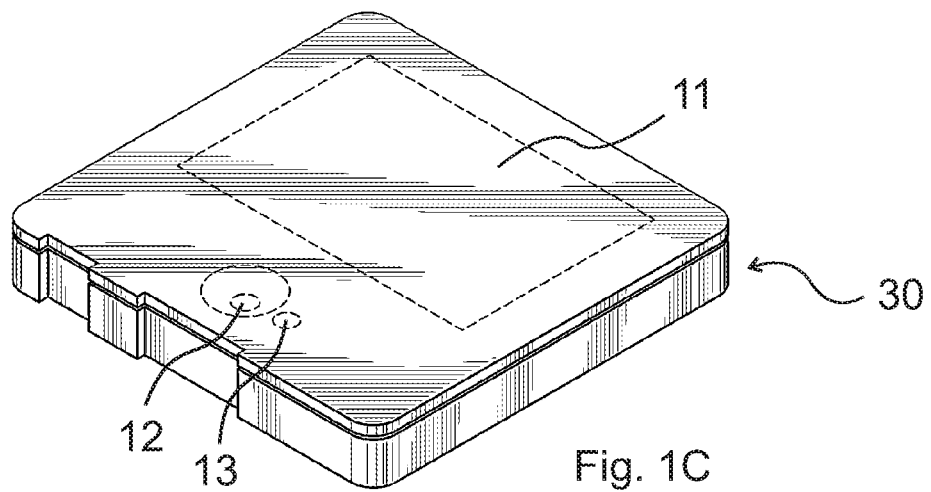
FIG. 1C is a spatial drawing showing the cuvette according to FIGS. 1A-1B in an assembled state.

The container 30 according to FIGS. 1A-1C consists of an upper part 10 and a lower part 20. The upper part 10 shown in FIG. 1A is formed with a transparent upper window portion 11 enabling optical analysis. In order to improve the accuracy of optical analysis, the upper window portion 11 has a polished surface on both sides.

Furthermore, in the upper part 10 there is an inlet aperture 12 starting from a conic indentation, and an outlet aperture 13 designed for discharging air from the container when the liquid is filled in. In particular FIG. 1B shows that an analyzing space of the container 30 has two sections; an upper analyzing space-section is located in the upper part 10 of the container, a lower analyzing space-section is located in the lower part 20 of the container.

FIG. 1B is a spatial drawing showing the lower part 20 of the exemplary container 30. The lower part 20 is also fitted with a transparent lower window portion 21, which is polished on both sides. According to the invention, the thickness of the lower window portion 21 is less than 0.6 mm for improving image sharpness.

Figure 2:
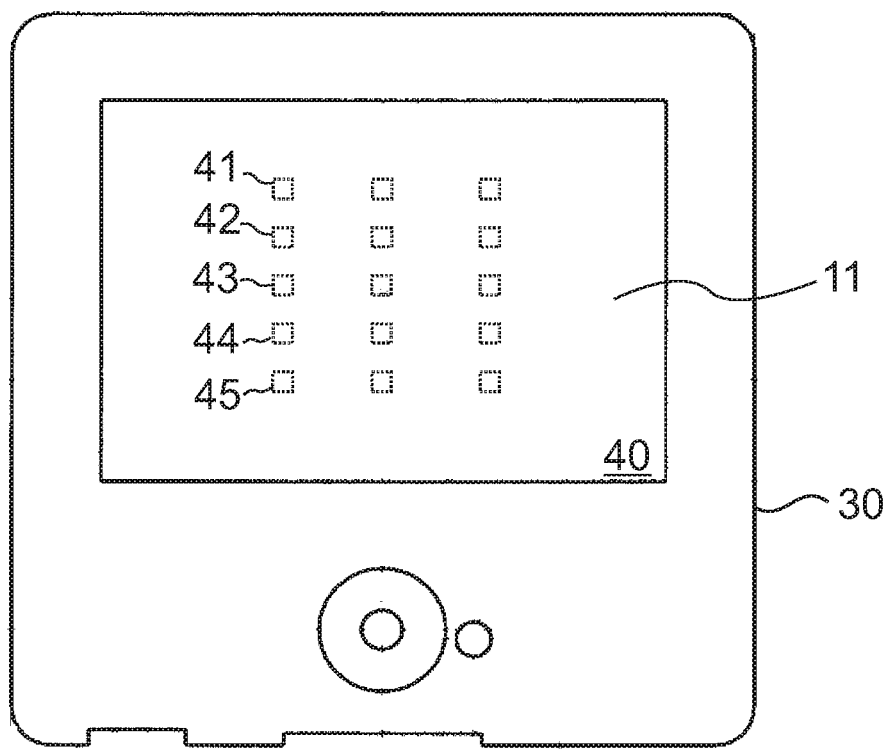
FIG. 2 is a top plan view of the cuvette according to FIGS. 1A-C, showing spatial regions of the analyzing space.

Prior to the optical analysis the container 30 is subjected to centrifuging, whereby images of the sediment of the liquid contained in an analyzing space 40 can be taken in a state where the sediment is centrifuged against the flat inner surface of the lower window portion 21, the analyzing space 40 being situated between the transparent upper window portion 11 and the transparent lower window portion 21 of the container 30 shown in FIG. 2.

The exemplary cuvette is adapted to receive 175 µl of urine, of which at least 2.2 µl has to be analyzed in human applications; the images have to be taken at a relatively greater number of locations, by way of example, fifteen analysis locations, i.e. more particularly, in spatial regions 41, 42, 43, 44, 45. In veterinary applications, the number of image recoding locations is typically greater than that, for example, images are preferably taken at seventy locations. The spatial regions 41, 42, 43, 44, 45 are preferably positioned laterally in such a way that they are distributed in the analyzing space 40 to the greatest possible extent while not overlapping with each other. In case the cuvette is positioned by rotation, the analysis locations will have a fanned-out spatial arrangement, i.e. a spatial arrangement different from that shown in FIG. 2

Figure 3:
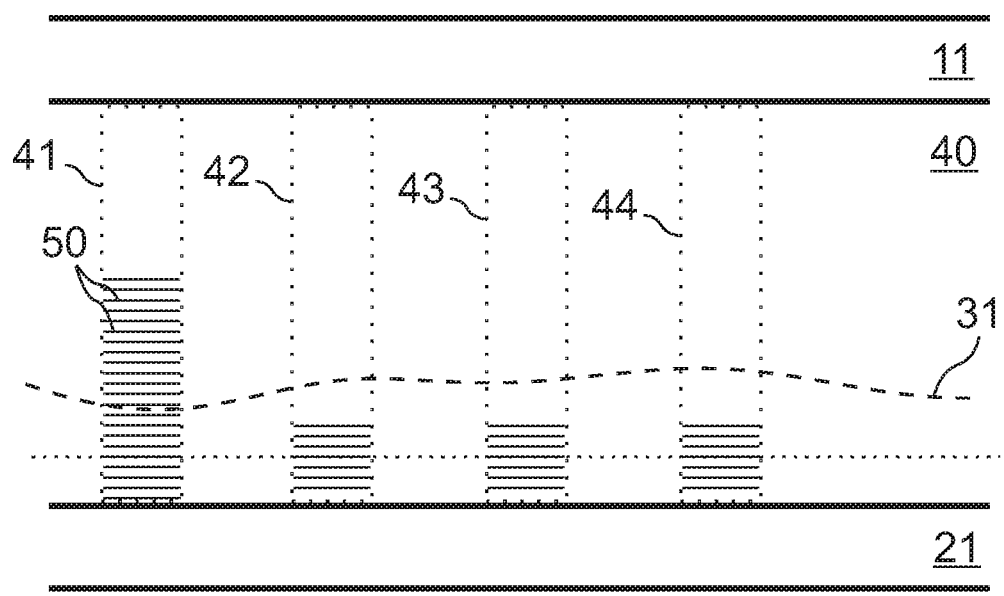
FIG. 3 is a schematic cross-sectional illustration of the steps of a non-adaptive image taking method.
Figure 4:
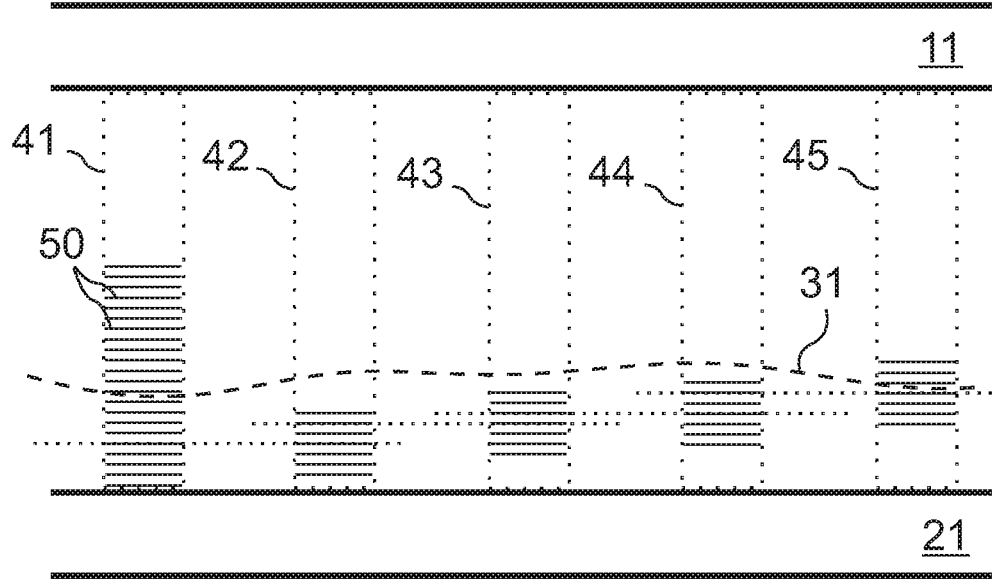
FIG. 4 is a schematic cross-sectional illustration of the steps of an adaptive image taking method.
Figure 5:
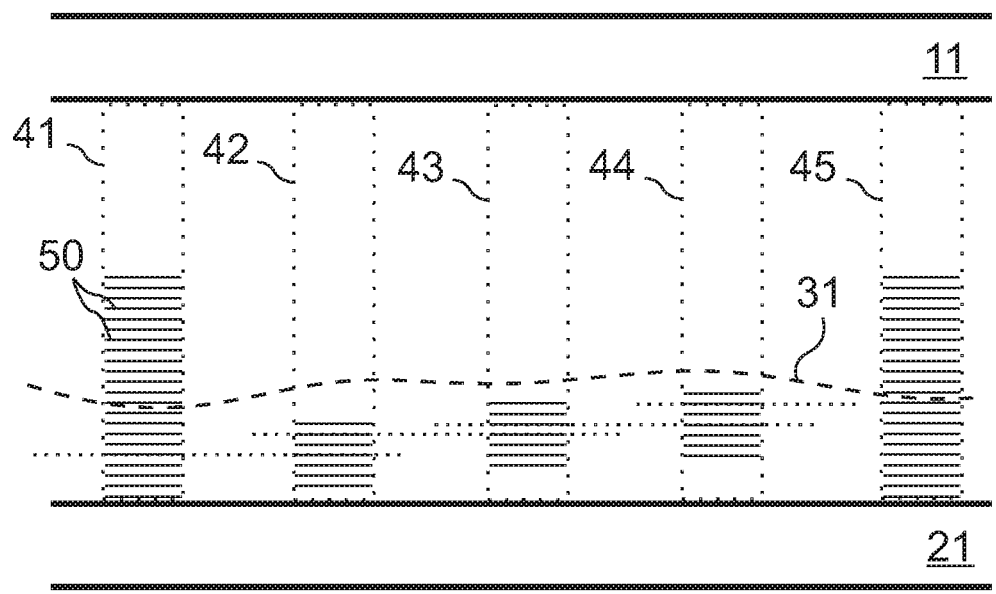
FIG. 5 is a schematic cross-sectional illustration of the steps of a partially adaptive image taking method.

FIGS. 3 to 5 show the steps carried out according to various embodiments of the image taking method according to the invention.

In the course of the image taking method according to the invention, images are taken in the analyzing space 40 with a microscope at focal plane positions 50 shifted with equal step size, and from the taken images an image is selected that is best suited for further image processing. As set forth above, images of the sediment 31 of the liquid contained in the analyzing space 40 situated between the transparent upper window portion 11 and the transparent lower window portion 21 of the container 30 adapted for analyzing a liquid are taken such that the sediment 31 is centrifuged against an inner flat surface of the lower window portion 21. This circumstance requires that the images are taken with the cuvette oriented horizontally.

In a first step of the method, a first depth image sequence is taken in a first spatial region 41 of the analyzing space 40 at focal plane positions 50 shifted in a depth direction perpendicular to the flat surface with equal step size, and an image with a best contrast is selected from the first depth image sequence for further image processing. In FIG. 3, the focal plane position 50 of the image of the first spatial region 41 with the best contrast is indicated by a dotted line. In the context of the present invention, the term "focal plane position" 50 is used to refer to the position of the focal plane in the depth direction according to the invention, i.e. its height position.

According to the invention, the information on the focal plane position 50 so determined is also utilized in other spatial regions 42, 43, 44, 45. According to FIG. 3, in a second spatial region 42 of the analyzing space 40, a second depth image sequence is taken at focal plane positions 50 shifted in the depth direction, with equal step size, where one focal plane position 50 of the intermediate focal plane positions 50 of the second depth image sequence is the same as the focal plane position 50 having the best contrast of the first depth image sequence. The second depth image sequence has fewer images than the first depth image sequence; this is possible because the depth range to be scanned through is a range encompassing the best focal plane position 50 determined for the first spatial region 41. If the first, much longer depth image sequence was taken in all analyzed spatial regions, the measurement would take an unacceptably long time. Therefore, the relatively short duration of the second depth image sequence is an essential feature of the invention. An image with a best contrast is selected also from the second depth image sequence for further image processing. This latter image is not necessarily located at the best focal plane position 50 determined for the first spatial region 41, because the height and composition of the sediment 31 may vary spatially, and also because the transparent lower window portion 21 can deviate from a horizontal orientation. Accordingly, the best-contrast focal plane position 50 of the second spatial region 42 may be shifted from the dotted line by one or more step sizes.

Preferably, the best-contrast focal plane position 50 of the first depth image sequence is the same as a central focal plane position 50 of the second depth image sequence. Thus, the best-contrast focal plane position 50 of the second spatial region 42 will most likely be included in the analysis in the case of a downward shift and also in the case of an upward shift.

The first depth image sequence is preferably selected such that it comprises focal plane positions 50 extending over the largest empirically observed depth extension of the sediment 31. By way of example, the first depth image sequence can consist of 100 steps of a step size of 2.5 µm or 200 steps of a step size of 1.25 µm, while the second (and subsequent) depth image sequences can consist of 8, 16, 32 steps of the same respective step size, or may have other number of steps that is fewer than the number of steps of the first depth image sequence.

An implementation can also be envisaged in which the depth step size of the focal plane positions 50 of the second depth image sequence is smaller than the depth step size of the focal plane positions 50 of the first depth image sequence. Namely, by knowing a determined ideal position, the image with the best contrast can be searched for by applying a finer step size while keeping the computational/processing demand sufficiently low. In such a case, however, an additional image sequence having the smaller step size has to be taken near the ideal position also in the first spatial region 41 after taking the first depth image sequence, so that the best-focused image can also be determined there with a similar accuracy as in the other spatial regions 42, 43, 44, 45.

As can be seen in FIGS. 3-5, additional depth image sequences are taken in further spatial regions 43, 44, 45 of the analyzing space 40, followed by selecting from each depth image sequence the image with the best contrast for further image processing. The previously determined information related to the best-contrast location can be utilized for taking these additional images in a number of ways, for example according to the three alternatives detailed here below.

According to a first alternative represented by a preferred embodiment depicted in FIG. 3, the additional depth image sequences are also taken by applying the focal plane positions 50 of the second depth image sequence. This so-called non-adaptive alternative has the lowest computational demand so it provides the fastest operation.

According to a second alternative represented by a preferred embodiment shown in FIG. 4, all additional depth image sequences are taken by applying focal plane positions 50, which contain the best-contrast focal plane position 50 of the previous depth image sequence as an intermediate focal plane position 50, and which are shifted in the depth direction with an equal step size. Preferably, a central focal plane position 50 of an additional depth image sequence is the same as the best-contrast focal plane position 50 of a previous depth image sequence. These latter are indicated in FIG. 4 by dotted lines interconnecting the schematically shown image sequences. This so-called adaptive embodiment has the advantage that it can follow the height level changes of the sediment 31 or the transparent lower window portion 21, so the image having the best contrast can be most likely found at all analyzed locations.

According to a third alternative represented by a further preferred embodiment shown in FIG. 5, if the focal plane position 50 of the previous depth image sequence providing the best contrast reaches, approaches to a predetermined extent, or exceeds the boundaries of a predetermined depth range, the additional depth image sequence is taken applying the focal plane positions 50 of the first depth image sequence. The additional depth image sequence is preferably taken by applying the focal plane positions 50 of the first depth image sequence in case the best-contract focal plane position of the previous depth image sequence falls outside the range defined by the focal plane positions of the second depth image sequence, but of course other empirical criteria can also be set. The advantage of this so-called partially adaptive embodiment is that, in case it is detected that the best-contrast image leaves the "normal" range, then it can be assumed that some kind of anomaly has occurred, so it is expedient to perform the initial multi-step image taking sequence again. Such an anomaly can be caused for example by certain characteristics of the urine sediment, for example the presence of large-size lipids may shift the focal plane position 50 detected as ideal to an overly high position, with the part of the sediment 31 providing the relevant information still remaining in the deeper ranges though with occasional exceptions in particular analyzing locations.

It is particularly preferable if the depth step size of the focal plane positions 50 is 50-100% of the depth of focus (DOF) of the microscope. A depth step size smaller than 50% of the DOF will cause that more than one image fulfills the best-contrast criterion, which results in performing unnecessary computations. In the case of a depth step size value greater than 100% of the DOF it is possible that no image will be taken in the range that provides the best contrast. For example, with a DOF of 1.5 µm it is preferred to apply a step size of 1.25 µm.

For performing the analysis of the urine sediment, high-resolution grayscale digital images are taken at various planes in every region of the field of view, i.e. in the spatial regions 41, 42, 43, 44 and 45. In the next step, a focusing algorithm known per se is applied for selecting the "best" image, i.e. the image that has the best contrast according to a suitable function, which image will constitute the input information for an artificial intelligence-based nonlinear image analysis module based on neural networks.

The image taking method according to the invention has the advantage that it allows for inputting to the analysis module other images in addition to the best image, preferably allowing the taking and using of one or more pairs of images taken at planes situated in the same distance above and below from the plane of the best image. These additional images are not as sharp as the selected image but may contain important complementary information on the objects in the field of view under analysis. It may happen that objects or particles, for example in the case of urine sediment, red blood corpuscles and fungi, appearing identical in the best-focused image, i.e. the image with the best contrast, undergo dimming/distortion/blurring in different ways in other planes located further and further from the best focal plane, for example due to their different height, density/optical density/refractivity, etc. Thus, such objects can be better differentiated, which improves the recognition capability of the analysis module.

In a physical sense, the images taken at different planes, i.e. at different focal plane positions contain not only intensity distribution information but collectively also contain phase information, so they can even be applied for generating a digital phase-contrast (DPC) image. For example, by producing a difference of two images taken at different planes, or by applying more complex functions, even better/more visually appealing contrast images can be provided. Although the latter function is more useful for displaying the images, the images generated in such a manner may also be worth inputting to the analysis module. Besides that, the neural network can easily "find out" how to use the difference of images, and will learn to perform the subtraction.

It is important that the focal planes of the successive images are at equal distance from each other when the focal series is taken.

According to the invention, therefore, at least one additional image is selected for further image processing preferably from each depth image sequence, wherein the focal plane position 50 of the at least one additional image is located at the same relative distance from the best-contrast focal plane position 50 in all depth image sequences.

It is preferable if more than one additional image is selected for further image processing from each depth image sequence, wherein the additional images, together with the best-contrast image, having respective focal plane positions 50 shifted with equal distance along the depth direction.

In a particularly preferred embodiment, at least one pair of additional images is selected for further image processing from all depth image sequences, the images of the image pair being located above and below the best-contrast focal plane position 50 at the same distance from the best-contrast focal plane position 50.

Therefore, according to the above, the invention relates to an image analysis method applying an image analysis module having a neural network trained for image analysis, wherein images taken applying the image taking method according to the invention being inputted to the image analysis module.

By taking additional images in each field of view, optionally a so-called "extended training method" is made available for training the image analysis neural network. This is to mean that, for example in an image analysis system analyzing 3 images in each analysis location, i.e. field of view or spatial region, 5 images are taken for training, with the image combinations 1-2-3, 2-3-4 and 3-4-5 also being utilized for training the image analysis module, where image 3 is the best-contrast image.

Thereby, the uncertainty by +/−one plane of the best-contrast image is also trained, i.e. a potential one-plane error of the focusing process can be eliminated, the result of the analysis will not depend on it, i.e. it will be invariant to a shifting by +/−one plane.

With 1+2n images to be analyzed it is preferred to take not only 1+2n+2 images (this is the minimum number that is sufficient for training) but even as many as 1+4n images for the training process, such that the uncertainty of the best-focus plane can be trained up to the half of the range applied for the analysis.

For specifying the range applied for extended training it has to be taken into account that, although more images contain more information, but the more images the analyzing algorithm receives, the more operations are to be executed in the course of computation and the duration of the analysis process is longer.

It is preferred to select a step size around the DOF value between the focal planes of the taken images. The reason for that is that if the focal planes of the taken images are at a significantly greater distance from each other than the DOF, a really sharp best-focused image will possibly not be taken. If a distance as large as the DOF is applied, there will always be one or two very high-quality images, provided that the range of the focal series is chosen appropriately, i.e. it includes the best focus. Besides, by applying extended training the independence from the constraint of best focus inaccuracy of at least +/−one plane can be achieved. In practice, with a well-selected distance, near the DOF value, it is advisable to take a 3-image input and a 5-image training file.

The best result, highest amount of information, is not necessarily obtained utilizing the images immediately adjacent to the best-focus image. When implementing the analysis module it is worth trying the 3-input plane training process utilizing images situated at +/−2 or even 3 planes from the best-focus image. The further the focal planes of the images selected additionally are, the less those will resemble the best-focused image (this is advantageous because those will have different information content), but also the less sharp the images will be as those are more distanced from the best-focus plane (this is disadvantageous because the information contained in the images is less direct; images with a focal plane really far from the best-focus plane can even be completely homogeneous, i.e. background-like, providing very little additional information).

The theoretical approach indicates that phase information content is optimal in such cases where images located by the same distance above and below the best-focused image are applied, instead of applying a theoretically possible asymmetric image selection.

Of course, the invention can in principle operate utilizing as few as two images, for example the best-focus image and another image taken at another focal plane. Even in such a case, the analysis module receives additional information, with phase information also being available.

The invention therefore also relates to a method for training an image analysis neural network, wherein the training of the network is performed applying images taken by the image taking method according to the invention.

As set forth above, the training is preferably performed applying more taken images for each spatial region 41, 42, 43, 44, 45 than the number of images that are to be input for image analysis to the image analysis neural network for each spatial region 41, 42, 43, 44, 45.

It is particularly preferable if the training process is performed utilizing at least two additional images that are taken above and below the images to be input for image analysis to the image analysis neural network.

The training process can also be performed utilizing as many additional images as the number of the images taken above and below the best-contrast focal plane position 50 that are to be input for image analysis to the image analysis neural network.

The invention also relates to an image analysis neural network that is adapted for application in an apparatus for analyzing bodily fluids and is trained by applying the method according to the invention. The first (input) layer of the neural network structure according to the invention is adapted to receive more than one input images.

For implementing the invention it is important that the images of the same field of view, taken at different planes, are taken quickly, i.e. the time elapsed between taking the images is as short as possible, such that the objects to be analyzed, for example, in the case of urine sediment, bacteria, move to the smallest possible extent during the taking of the image sequence. This is one of the reasons why it is not recommended to take images very far from the optimal focal plane; it takes longer to focus to planes located further from the optimal focal plane.

It is also important to ensure that the mechanical design of the system allows for taking image sequences of the same field of view, such that the images taken at different focal planes are not shifted in the x and y directions, i.e. that they really show the same field of view. This is a condition for the proper operation of the invention.

Of course, the invention is not limited to the embodiment shown by way of example, but further modifications and alterations are possible within the scope of the claims. The container according to the invention can not only be used for the optical analysis of urine, but also for that of other liquids.

The invention claimed is:

1. An image analysis method for analysing images, said images being taken by an image taking method, said image taking method comprising: taking said images with a microscope and selecting a subset of the taken images for image analysis, in the image taking method taking the images of a sediment of a liquid filled in an analyzing space located between a transparent upper window portion and a transparent lower window portion of a container adapted for analyzing the liquid, wherein the sediment is centrifuged on an inner flat surface of the transparent lower window portion, wherein the image analysis method comprises:

taking, with the microscope and in a first spatial region of the analyzing space, a first depth image sequence at first focal plane positions shifted with an equal step size in a depth direction perpendicular to the flat surface, selecting, from the first depth image sequence and by applying a focusing algorithm, an image with a best contrast for the image analysis, taking, with the microscope and in a second spatial region of the analyzing space, a second depth image sequence at second focal plane positions shifted with an equal step size in the depth direction, wherein the step size of the second depth image sequence is the same or is smaller than that of the first depth image sequence, wherein the second depth image sequence has fewer images than the first depth image sequence, and wherein an intermediate focal plane position, of intermediate focal plane positions from the second focal plane positions of the second depth image sequence, is the same as a focal plane position with a best contrast of the first depth image sequence, selecting, from the second depth image sequence and by applying the focusing algorithm, an image with the best contrast for the image analysis, also selecting, for the image analysis, at least one additional image from each depth image sequence, wherein a respective focal plane position of the at least one additional image is located at a same relative distance from a best contrast focal plane position in each depth image sequence, and providing each selected image to an image analysis module having a neural network trained for the image analysis to cause the neural network to perform the image analysis.

2. The image analysis method according to claim 1, characterized in that the focal plane position with the best contrast of the first depth image sequence is the same as a central focal plane position of the second depth image sequence.

3. The image analysis method according to claim 1, characterized by taking additional depth image sequences in further spatial regions of the analyzing space, and selecting from each depth image sequence a respective image with a best contrast for the image analysis.

4. The image analysis method according to claim 3, characterized by taking the additional depth image sequences applying the second focal plane positions of the second depth image sequence.

5. The image analysis method according to claim 3, characterized in that each additional depth image sequence is taken applying focal plane positions which contain a best contrast focal plane position of a previous depth image sequence as a particular intermediate focal plane position, and which are shifted in the depth direction with an equal step size.

6. The image analysis method according to claim 5, characterized in that a central focal plane position of the additional depth image sequence is the same as the best contrast focal plane position of the previous depth image sequence.

7. The image analysis method according to claim 5, characterized in that if the best contrast focal plane position of the previous depth image sequence reaches, approaches to a predetermined extent, or exceeds boundaries of a predetermined depth range, the additional depth image sequence is taken applying the focal plane positions of the first depth image sequence.

8. The image analysis method according to claim 7, characterized in that the additional depth image sequence is taken applying the focal plane positions of the first depth image sequence if the best contrast focal plane position of the previous depth image sequence is outside of the range defined by the focal plane positions of the second depth image sequence.

9. The image analysis method according to claim 1, characterized by selecting, for the image analysis, more than one additional image from each depth image sequence, wherein the additional images, together with a respective best contrast image for each depth image sequence, have respective focal plane positions shifted with an equal distance in the depth direction.

10. The image analysis method according to claim 9, characterized by selecting, for the image analysis, at least one pair of images from all depth image sequences, wherein images constituting the at least one pair of images are located above and below the best contrast focal plane position at the same distance from the best contrast focal plane position.

11. A method for training an image analysis neural network with images taken by means of an image taking method, the image taking method comprising: taking said images with a microscope and selecting a subset of the taken images for training, in the image taking method taking the images of a sediment of a liquid filled in an analyzing space located between a transparent upper window portion and a transparent lower window portion of a container adapted for analyzing the liquid, wherein the sediment is centrifuged on an inner flat surface of the transparent lower window portion, wherein the method for training the image analysis neural network comprises:

taking, with the microscope and in a first spatial region of the analyzing space, a first depth image sequence at first focal plane positions shifted with an equal step size in a depth direction perpendicular to the flat surface, and selecting, from the first depth image sequence and by applying a focusing algorithm, an image with a best contrast for training, taking, with the microscope and in a second spatial region of the analyzing space, a second depth image sequence at second focal plane positions shifted with an equal step size in the depth direction, wherein the step size of the second depth image sequence is the same or is smaller than that of the first depth image sequence, wherein the second depth image sequence has fewer images than the first depth image sequence, and wherein an intermediate focal plane position, of intermediate focal plane positions from the second focal plane positions of the second depth image sequence, is the same as a focal plane position with a best contrast of the first depth image sequence, and selecting, from the second depth image sequence and by applying the focusing algorithm, an image with the best contrast for training, also selecting, for training, at least one additional image from each depth image sequence, wherein a respective focal plane position of the at least one additional image is located at a same relative distance from a best contrast focal plane position in each depth image sequence, and providing each selected image to an image analysis module having the image analysis neural network to cause the image analysis neural network to be trained to perform image analysis.

12. The training method according to claim 11, characterized by applying for the training more taken images for each spatial region than the number of images that are input for the image analysis to the image analysis neural network for each spatial region.

13. The training method according to claim 12, characterized by performing the training with at least two additional images that are taken above and below the images to be input for the image analysis to the image analysis neural network.

14. The training method according to claim 13, characterized by performing the training with as many additional images above and below as the number of the images taken above and below the best contrast focal plane position that are to be input for the image analysis to the image analysis neural network.

* * * * *